United States Patent Office

3,251,858
Patented May 17, 1966

3,251,858
2-{N-[OMEGA-PHENYL-OMEGA-THIENYL-ALKYL-(1)]}-AMINO-3-PHENYL-PROPANE
Kurt Thiele and Albert Gross, Frankfurt am Main, Germany, assignors to Deutsche Gold- und Silber-Scheideanstalt vormals Roessler, Frankfurt am Main, Germany
No Drawing. Filed Nov. 9, 1962, Ser. No. 236,733
Claims priority, application Germany, Nov. 10, 1961, D 37,431
1 Claim. (Cl. 260—332.3)

The present invention relates to new pharmacologically valuable compounds of the formula:

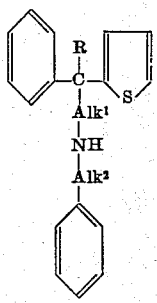

I in which R is hydroxy, $Alk^1$ and $Alk^2$ are straight or branch chained lower alkylene groups of 2–4 carbon atoms, at least 2 of which are in the chain between the CR and NH groups and respectively in the chain between the NH and phenyl groups, their pharmaceutically acceptable acid addition salts and quaternary ammonium compounds and process for their preparation.

The compounds according to the invention have valuable central nervous system stimulating and coronary dilating properties.

The compounds according to the invention, for example, can be prepared by reacting a compound of the formula

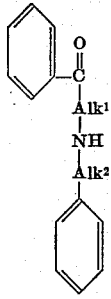

II with

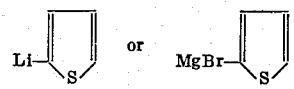

to form a compound of the formula

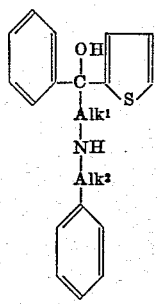

III

The novel compounds according to the invention can also be prepared in various other ways, for example, a compound of the formula

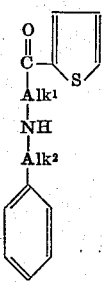

V can be reacted with

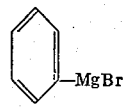

to produce a hydroxy compound of Formula III.

The bases thus obtained can be converted to their acid addition salts by reacting with pharmaceutically acceptable organic or inorganic acids, such as acetic, hydrochloric, hydrobromic, hydriodic, sulfuric, phosphoric, citric, p-toluene sulfonic acids and the like. They also may be converted into the corresponding quaternary salts with the aid of lower alkyl halides, such as methyl bromide, methyl iodide, as well as other alkyl acid derivatives.

The following examples will serve to illustrate the invention with reference to several embodiments thereof.

*Example 1*

A solution of 12.8 g. butyl lithium (0.2 mol) in 20 cc. of absolute ether was cooled to 15° C. and 8.4 g. of thiophene (0.1 mol) added thereto dropwise at this temperature. After half an hour the reaction mixture was cooled down to 5° C. and 26.7 g. (0.1 mol) of 2-{N-[3' - phenyl-3'-oxo-propyl-(1')}-amino-3-phenyl-propane dissolved in ether added thereto. After such addition the mixture was stirred for a further hour and then decomposed with aqueous $NH_4Cl$ while cooling. The ether layer was then separated off and the 2-{N-[3'-phenyl-3'-thienyl - 3' - hydroxy-propyl-(1')]}-amino-3-phenyl-propane isolated therefrom. The free base had a boiling point of 235–240° C. at 2 mm. Hg. The base formed a hydrochloride having a melting point of 190° C.

*Example 2*

A Grignard solution was prepared from 4.8 g. of Mg filings (0.2 mol) and 32.6 g. of 2-bromo-thiophene in dry ether. 60.6 g. (0.2 mol) of 2-{N-[3'-phenyl-3'-oxo-propyl-(1')]}-amino-3-phenyl-propane.HCl suspended in dry ether were added dropwise to the Grignard solution. The reaction immediately went to completion. The reaction mixture was decomposed with $NH_4Cl$ and $H_2O$, the hydrochloride salt of the reaction product converted to the free base with dilute NaOH and the free base 2-{N-[3' - phenyl-3'-trienyl-3'-hydroxy-propyl-(1')]}-amino-3-phenyl-propane isolated as an oil by extraction with ether and evaporating the ether off from the extract. The free base was neutralized with isopropanolic HCl. The melting point of the resulting HCl salt was 190° C. as in Example 1. The yield was 47 g.=67%.

We claim:
The compound 2 - {N-[3'-phenyl-3'-(2-thienyl)-3'-hydroxy-propyl-(1')]}-amino-3-phenyl-propane.

References Cited by the Examiner

UNITED STATES PATENTS 2,837,525 6/1958 Ruddy et al. _____ 260—332.3

FOREIGN PATENTS 579,750 7/1959 Canada.
1,051,281 2/1959 Germany.

OTHER REFERENCES

"Burger Medicinal Chemistry," Interscience Inc., New York (1960), p. 598.

Ehrhart Archiv der Pharmazie, vol. 295 (March 1962), pp. 196–205.

IRVING MARCUS, *Primary Examiner.*

JOHN D. RANDOLPH, WALTER A. MODANCE,
*Examiners.*